(12) United States Patent
Wegmaier et al.

(10) Patent No.: US 6,485,282 B2
(45) Date of Patent: *Nov. 26, 2002

(54) DEVICE FOR THE EXTRUSION OF PLASTIC PROFILES

(75) Inventors: Rudolf Wegmaier, Micheldorf (AT); Frank Dorninger, Micheldorf (AT); Walter Gugenberger, Gunskirchen (AT)

(73) Assignee: Technoplast Kunststofftechnik GmbH, Micheldorf (AT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/493,133

(22) Filed: Jan. 28, 2000

(65) Prior Publication Data

US 2002/0054930 A1 May 9, 2002

(30) Foreign Application Priority Data

Jan. 28, 1999 (AT) .......................... GM 58/99

(51) Int. Cl.⁷ .......................... B29C 47/16; B29C 47/12
(52) U.S. Cl. ..................... 425/71; 425/72.1; 425/326.1; 425/388; 425/465; 425/466
(58) Field of Search ............... 425/72.1, 378.1, 425/379.1, 388, 465, 466, 71, 326.1; 264/177.1, 209.7

(56) References Cited

U.S. PATENT DOCUMENTS

| | | | |
|---|---|---|---|
| 3,884,611 A | 5/1975 | Anderson et al. | 425/376 |
| 4,209,475 A | * 6/1980 | Herrington et al. | 264/40.1 |
| 4,382,766 A | * 5/1983 | Feuerherm | 425/465 |
| 4,455,761 A | * 6/1984 | Terhune et al. | 34/14 |
| 4,789,327 A | 12/1988 | Chan et al. | 425/133.1 |
| 4,911,868 A | 3/1990 | Reifenhauser et al. | 264/40.2 |
| 5,102,602 A | 4/1992 | Ziegler | 264/209.2 |
| 5,281,375 A | * 1/1994 | Konermann | 264/40.3 |
| 5,462,423 A | * 10/1995 | Beckwith | 264/40.6 |
| 5,505,058 A | * 4/1996 | Dorninger | 425/326.1 |
| 5,743,928 A | * 4/1998 | Pfleiderer | 65/83 |

FOREIGN PATENT DOCUMENTS

| | | |
|---|---|---|
| DE | 19829183 | 1/2000 |
| EP | 0593892 | 4/1994 |

OTHER PUBLICATIONS

Patent Abstracts of Japan, vol. 017, No. 524, Sep. 21, 1993 entitled "Mold for Extension Molding . . . pipe" of JP 05 138715 A, Tsutsunaka Plast Ind. Co. Ltd., Jun. 8, 1993.

* cited by examiner

Primary Examiner—Jan H. Silbaugh
Assistant Examiner—Donald Heckenberg
(74) Attorney, Agent, or Firm—Dykema Gossett PLLC

(57) ABSTRACT

A device for the extrusion of plastic profiles with an extruder for the melting and delivery of a plastic material and with an extrusion die for defining the profile geometry, wherein a profile slot corresponding to the profile to be extruded and being defined by an outer periphery and by at least one arbor is provided in the extrusion die. The profile tuning is made easier by having a means for operational change of the profile slot's thickness provided in at least one predetermined area between the arbor and the outer periphery as well as a means for cooling selected areas of the extruded profile provided at the exit of the die.

10 Claims, 3 Drawing Sheets

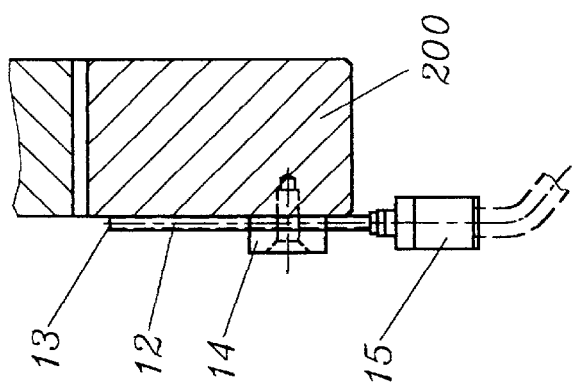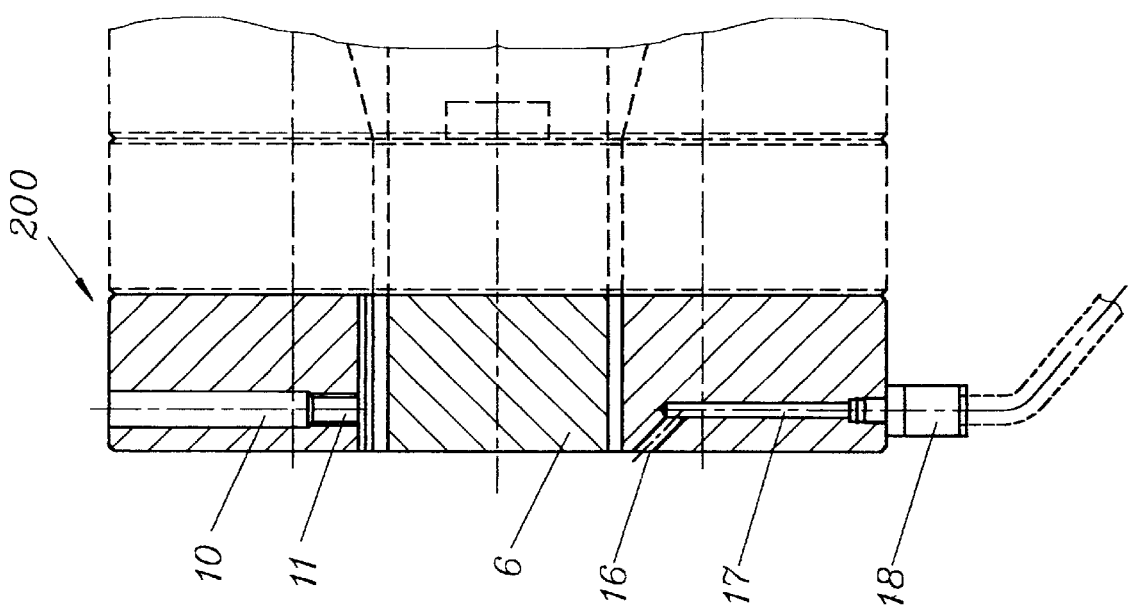

DEVICE FOR THE EXTRUSION OF PLASTIC PROFILES

BACKGROUND OF THE INVENTION

The present invention relates to a device for the extrusion of plastic profiles with an extruder for the melting and delivery of a plastic material and with an extrusion die for defining the profile geometry, whereas a profile slot corresponding to the profile to be extruded and being defined by an outer periphery and by at least one arbor is provided in the extrusion die.

Profiles used in the fabrication of window frames made of plastic are made by extrusion, whereas plastic granules are melted in an extruder and led to an extrusion die provided with a profile slot which corresponds to the geometry of the profile to be extruded. After having passed the extrusion die, such a profile is first sized in dry sizing installations and then submitted to a first cooling phase before it is ultimately cooled down in a water bath or in a spray tank.

An essential part of the measures implied in the production of an extrusion line for a new profile is the tuning. Nowadays, even with the most sophisticated calculating and simulation methods, it is not possible to delineate all the relevant actions taking place in an extrusion die or in an extrusion tool in such a precise manner so that an extrusion tool may be designed in a purely constructive way. In practice it is necessary to first produce the extrusion die and the tools in a first version and then to submit them to a tuning procedure. The tuning, which is made with the original material of the subsequent profile production, analyzes the deficiencies of the manufactured profile and improves it by slight changes operated on the extrusion die and on the extrusion tools. Measures taken during the tuning phase are for example minor alterations in the geometry of the component parts or changes in the temperature distribution within the component parts by additional heating, cooling or insulating. Since, to make such alterations, it is necessary to dismantle the corresponding tools and to finish them accordingly, tuning implies a very complicated procedure.

Thanks to the technological development, the progress that has been made these last years in the field of the productivity of tools is big. It was thus possible to considerably lower the costs for the production of tools. Since however the tuning procedure has essentially remained the same, it still bears considerable saving potential. It is therefore necessary to reduce the number of tuning courses in particular. This desire is particularly urgent with tools intended to be utilized for small or smallest piece numbers. Prototype tools for example are designed for only a few hours of production so that experiments may be made with new profile geometries or with new materials. Such prototype tools may be manufactured in a simple way and at low cost, since they do not require high production speed or long durability. Since the experimental runs are usually executed by skilled personnel, it is not necessary either to optimize them for use or to make them tolerant to operating errors. These very tools however would in particular need extrusion dies which do not or hardly have to be tuned.

DESCRIPTION OF THE PRIOR ART

A profile tool for an extruder is known from EP 0 593 892. The prior art profile tool has temper elements arranged in its flow channel by means of which the melted plastic material may be heated in a controlled way in some areas of the flow's cross section. This makes it possible to compensate irregularities due to geometry when the material is passing through the profile slot. With these measures however, it proved very difficult to intervene to good purpose in the production of the profiles. On one hand, the flow conditions between the heating elements and the profile slot itself cannot or only insufficiently be predicted so that it is difficult to decide in which area purposeful heating should take place. On the other hand, the reaction of such a device is very slow, so that the effects of an alteration made can only be fully observed after a considerable lapse of time. Even for persons skilled in extrusion it is extremely difficult to proceed to tuning according to this teaching.

SUMMARY OF THE INVENTION

It is an object of the present invention to develop the device described above in such a manner so that the measures implied in tuning can be kept as simple as possible.

According to the invention, a means is provided for the operational alteration of the thickness of the profile slot in at least one predetermined area between the arbor and the outer periphery and another means is provided for cooling selected areas of the extruded profile at the exit of the die. If, for example, in a tuning course, deficiencies in the profile are realized to possibly originate in a too high flow velocity of the material in a determined section of the profile, this very section of the profile slot in the extrusion tool may purposefully be reduced in size. Since this intervention may be made during the extrusion procedure, the measures implied are minimal. If, on the other hand, it has been noticed that the flow velocity of the material in a profile section is too high and that it cannot be influenced by altering the profile slot, the friction resistance in the subsequent sizing tool may be increased by purposeful cooling. Thus, the corresponding profile section is slowed down. These measures will be encountered in particular in complicated profile sections like lining grooves or ribs or profile overhangs.

A particularly simple and advantageous solution is characterized in that the means for altering the thickness of the profile slot is designed in such a manner so as to deform elastically the outer periphery. In this way, ridges or striae are avoided in the extruded profile on the contact surfaces of possibly mobile members.

A particular advantage consists in having at least one part of the outer periphery constituted by a thin-walled web that is mobile for the alteration of the profile slot's thickness. A particular fine tuning may thus be achieved. The means for altering the thickness of the profile slot is preferably designed as a pressure screw acting upon the outer periphery. With regard to construction, this solution is particularly simple and adequate for prototype tools.

It proved to be sufficient to provide the even profile areas having a bigger surface with a variable profile geometry, in order to come, in most cases, to satisfactory solutions. That is why the means for altering the profile thickness is arranged in an even profile area having a big surface.

In a particularly preferred embodiment of the present invention, the outer periphery is designed in such a manner so that it may be cooled down section after section. As already described above, to achieve profile tuning by thermal influence is already state of the art. The disadvantages of the known solutions, like the slowness of reaction and the difficulty to foresee effects may however be considerably reduced thanks to different measures. In this way, not only the flow resistance of individual profile parts is influenced in the subsequent dry sizing but a certain effect is already produced in the extrusion die. A particular advantage consists in having the means for cooling selected areas of the extruded profile provided, in the area where the profile exits the extrusion die, with nozzles oriented toward the profile and through which air may flow. Cooling by air flow has the advantage that no specific coolant is utilized which would have to be disposed of or recycled after use. It is particularly advantageous to have the nozzles provided together with a device for cooling air to a temperature below the ambient temperature. This method proved to require considerably less air so that a possibly undesired thermal influence on the extrusion die may be reduced.

A particularly compact and stable assembly is achieved by integrating the nozzles in the extrusion die.

On the other hand, improved flexibility is achieved by fastening the nozzles on a front side of the extrusion die. In this solution, the parts surrounding the extrusion die are also submitted to less cooling.

If necessary in order to achieve increased gloss of predetermined parts of the profile's surface, means for heating selected areas of the profile may additionally be provided at the die's exit. The easiest procedure is to have the corresponding profile sections blown with hot air.

BRIEF DESCRIPTION OF THE DRAWINGS

The invention will be explained in more detail with the help of the embodiment illustrated in the following figures:

FIG. 3 is a section along the line III—III in FIG. 2 and

FIG. 4 is a partial section along the line IV—IV in FIG. 2.

DETAILED DESCRIPTION OF THE PREFERRED EMBODIMENTS

Figure 1:
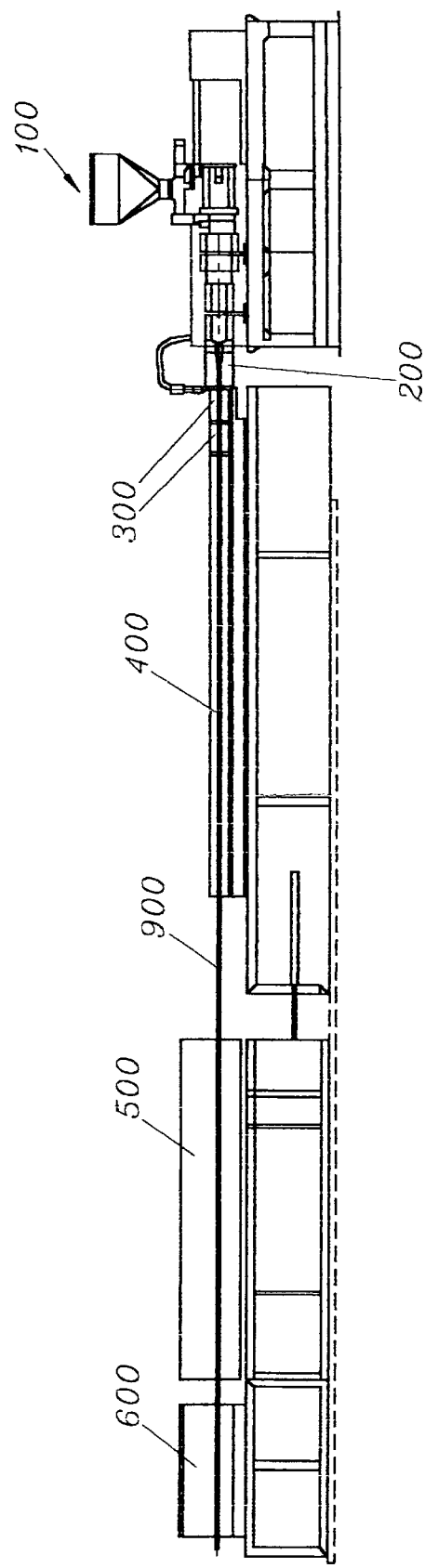
FIG. 1 is a diagrammatic view of a complete extrusion device.

In FIG. 1 there is shown the general structure of an extrusion device or extrusion line. Numeral 100 designates an extruder provided with an extrusion die 200. Downstream of the extrusion die 200, two dry sizing tools 300 are arranged to which is connected a wet sizing device 400 being designed as so-called whirl bath. This is a tub filled with cooling water which flows through the tub in longitudinal direction, whereas the tub is provided with sizing screens ensuring the desired shape of the profile 900. A caterpillar pull-off 500 ensures the transportation of the profile and a saw 600 cuts the profile 900 to the desired length.

Figure 2:
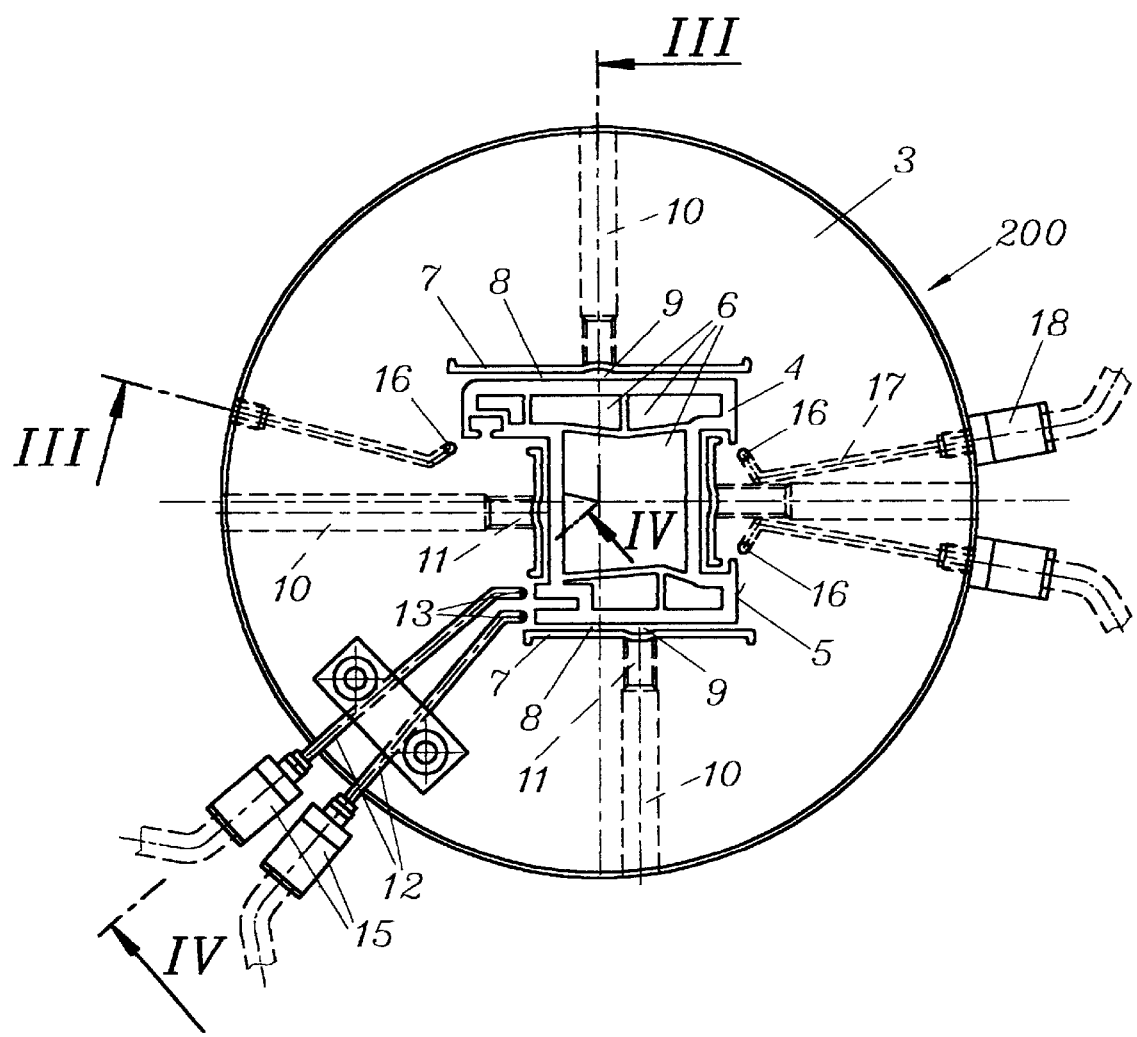
FIG. 2 is a top view of an extrusion die incorporating the present invention.

In FIG. 2, the extrusion die 200 is illustrated in a view showing its downstream front side 3. In the central area of the extrusion die 200, the profile slot 4 is designed for a window profile to be extruded. The profile slot 4 is defined on its outer circumference by an outer periphery 5, whereas the hollows of the profile to be extruded are defined by arbors 6. In the extrusion die 200 membrane slots 7 are provided parallel to bigger sections of the outer periphery 5 so that, between the membrane slots 7 and the outer periphery 5 of the profile slot 4, webs 8 remain, whereas the thickness thereof approximately corresponds to the thickness of the profile's wall, that is to the width of the profile slot 4. The webs 8 have a reinforced area 9 in their center. Bores 10 that are provided with an inner thread section 11 are arranged perpendicular to the webs 8 and parallel to the front area 3 of the extrusion die 200. A non-illustrated screw or threaded spindle can be introduced into these bores 10. The screw or threaded spindle is engaged with the thread section 11 and can exert pressure onto the reinforced section 9 of the web 8. The pressure may be fine-tuned by turning the threaded spindle by means of a hand wheel or the like. By thus elastically deforming the webs 8, the width of the profile slot 4 may be slightly changed in the respective areas. This is sufficient to influence the flow resistance and with it the flow rate.

Tubes 12 that can be traversed by cooling air are additionally fastened on the front side 3 of the extrusion die 200. The tubes have nozzles 13 arranged on their front end, which are oriented in such a manner so that the airflow impinges on selected parts of the non-illustrated profile directly after the profile emerges from the extrusion die 200. The tubes 12 are fastened on to the front side 3 by means of fixing links 14. Cooling devices having the shape of vortex tubes are alluded to under numeral 15, the vortex tubes being submitted to a very fast rotational momentum that leads to a cooling of the airflow. The cooling effect is thus improved.

An alternative solution for cooling the profile sections may be seen in FIG. 2 that shows the nozzles 16, which are connected to compressed air supplies 18 via bores 17. In the case of this solution, it is not necessary to accommodate add-on pieces on the front side 3 of the extrusion die 200.

FIG. 3 shows the second alternative for accommodating the nozzles 16, whereas in FIG. 4 the first solution with the nozzles 13 is illustrated.

Thanks to a fine tuning of the threaded spindle and to an appropriate rate control of the cooling air flowing through the nozzles 13 or 16, ample influence may be exercised over the extrusion with simple means during an extrusion procedure. If for example the person skilled in extrusion can attribute certain deficiencies in the manufactured profile to a too high flow rate of the material in the extrusion die at a determined location on the profile, she may immediately take the appropriate measures. If this problem occurs in the area of big wall sections of the profile, a possible solution will be to reduce the profile slot 4 in this area by tightening the corresponding threaded spindle. If however this problem occurs in the area of lining grooves or the like, a local cooling of the profile immediately upon its emerging from the extrusion die 200 may be achieved by increasing the air supply by means of the corresponding nozzles 13 or 16. This increases the resistance in the subsequent dry sizing, which reduces the local flow rate. The air exit nozzles 13 accommodated on the outside of the front side 3 of the extrusion die 200 can additionally be fine tuned by displacing them slightly. When tuning a prior art extrusion tool, the extrusion die has to be dismantled approximately five times in order to be able to proceed to the finest mechanical finish in the area of the profile slot. The present invention makes such finishing works almost superfluous. The present invention is particularly appropriate for so-called prototype tools, that is for cases in which a profile of acceptable quality has to be realized within a short period of time and at low cost. In case the appropriate skilled personnel is also available during the extrusion, even average piece numbers may be manufactured with such a tool.

We claim:

1. Apparatus for the manufacture of plastic profiles comprising an extruder for the melting and delivery of a plastic material as an extruded profile and a dry calibration device for treating said extruded profile; said extruder comprising an extrusion die for defining the profile geometry, said extrusion die defining an outer periphery and including at least one arbor to thereby define a profile slot which defines the profile of the plastic material extruded therethrough; means for operational change of a thickness of the profile slot in at least one predetermined area between an arbor and the outer periphery; and a means for cooling selected areas of the extruded profile exiting the die to tune extrusion, said means for cooling comprising nozzles which eject air toward the profile as said profile exits the die.

2. Apparatus according to claim 1, wherein the means for operational change of the thickness of the profile slot elastically deforms the outer periphery.

3. Apparatus according to claim 1, wherein at least one part of the outer periphery is constituted by a thin-walled web that is mobile for the alteration of the thickness of the profile slot.

4. Apparatus according to claim 1, wherein the means for altering the thickness of the profile slot comprises a pressure screw acting upon the outer periphery.

5. Apparatus according to claim 1, wherein the outer periphery includes a flat section and wherein the means for operational change of the profile thickness is located adjacent said flat section.

6. Apparatus according to claim 1, wherein the outer periphery is divided into a plurality of sections and wherein said cooling means can individually cool said sections.

7. Apparatus according to claim 1, including a device for cooling air passing through said nozzles to a temperature below the ambient temperature.

8. Apparatus according to claim 1, wherein the nozzles are integrated in the extrusion die.

9. Apparatus according to claim 1, wherein the nozzles are fastened on a front side of the extrusion die.

10. Apparatus according to claim 1, including a wet calibration device for treating said extruded profile after treatment in said dry calibration device.

* * * * *